United States Patent
Cameron et al.

(10) Patent No.: US 11,236,915 B1
(45) Date of Patent: Feb. 1, 2022

(54) SYSTEMS AND METHODS FOR BATCH PROCESSING AIR TAKEN FROM A POPULATED ENVIRONMENT TO DESTROY PATHOGENS AND THEN REINTRODUCE THE AIR INTO THE POPULATED ENVIRONMENT

(71) Applicant: RHC Ventures, LLC, Albuquerque, NM (US)

(72) Inventors: Robert H. Cameron, El Paso, TX (US); Luis M. Ortiz, Albuquerque, NM (US)

(73) Assignee: RHC Ventures, LLC, Albuquerque, NM (US)

( * ) Notice: Subject to any disclaimer, the term of this patent is extended or adjusted under 35 U.S.C. 154(b) by 0 days.

(21) Appl. No.: 17/359,099

(22) Filed: Jun. 25, 2021

Related U.S. Application Data

(60) Provisional application No. 63/076,390, filed on Sep. 10, 2020.

(51) Int. Cl.
| | |
|---|---|
| *F24F 8/22* | (2021.01) |
| *B01D 36/00* | (2006.01) |
| *F24F 8/158* | (2021.01) |
| *F24F 8/26* | (2021.01) |
| *F24F 13/02* | (2006.01) |

(52) U.S. Cl.
CPC .............. *F24F 8/22* (2021.01); *B01D 36/00* (2013.01); *F24F 8/158* (2021.01); *F24F 8/26* (2021.01); *F24F 13/02* (2013.01)

(58) Field of Classification Search
CPC ....... B01D 50/00; B01D 36/00; B01D 36/001
See application file for complete search history.

(56) References Cited

U.S. PATENT DOCUMENTS

| 8,653,478 B2 | 2/2014 | Khalid et al. |
| 10,188,975 B2 | 1/2019 | Fu et al. |

(Continued)

OTHER PUBLICATIONS

"Potential application of Air Cleaning devices and personal decontamination to manage transmission of COVID-19", SAGE-EMG Nov. 4, 2020.

(Continued)

*Primary Examiner* — Robert A Hopkins
(74) *Attorney, Agent, or Firm* — Ortiz & Lopez, PLLC; Luis M. Ortiz; Kermit D. Lopez

(57) ABSTRACT

Systems and methods for batch processing air taken from a populated environment to destroy pathogens contained therein. A multi-chamber treatment system can be coupled between one or more air return vents of the populated environment and one or more supply vents providing air into the populated environment. A filling chamber can be coupled to the air return vent(s) of the populated environment adapted to receive potentially contaminated air therefrom. An expressing chamber can include components for treating the potentially contaminated air to destroy pathogens. A relaxing chamber can allow treated air previously treated in the treatment compartment to stabilize. An exhausting chamber can be coupled to an air conditioning system serving the populated environment or the supply vent(s) providing air back into the populated environment. Treatment can be facilitated by ozone, UVC, and other means.

20 Claims, 5 Drawing Sheets

(56) References Cited

U.S. PATENT DOCUMENTS

| | | | |
|---|---|---|---|
| 10,875,744 | B1 | 12/2020 | Doyle |
| 10,967,093 | B2 | 4/2021 | Mount |
| 10,982,486 | B1 | 4/2021 | Avant |
| 11,000,191 | B2 | 5/2021 | Joseph et al. |
| 11,007,464 | B1 | 5/2021 | Landy |
| 11,040,123 | B2 | 6/2021 | Li et al. |
| 11,040,353 | B1 | 6/2021 | Cash |
| 2019/0009912 | A1* | 1/2019 | Matsui .................. B64D 13/08 |
| 2020/0129652 | A1 | 4/2020 | Woolbridge |
| 2020/0215474 | A1 | 7/2020 | Benedek et al. |
| 2020/0376213 | A1 | 12/2020 | He et al. |
| 2021/0086120 | A1 | 3/2021 | Burkhart-Day et al. |
| 2021/0190346 | A1 | 6/2021 | Khalis et al. |

OTHER PUBLICATIONS

"Enforcement Policy for Sterilizers, Disinfectant Devices, and Air Purifiers During the Coronavirus Disease 2019 (COVID-19) Public Health Emergency", Guidance for Industry and Food and Drug Administration Staff, Mar. 2020.

Bin Zhao, et al., "Air purifiers: A supplementary measure to remove airborne SARS-CoV-2", Building and Environment 177 (2020) 106918.

Prabjit Bam, "Residential Air Cleaner Use to Improve Indoor Air Quality and Health: A Review of the Evidence", National Collaborating Centre for Environmental Health, Oct. 2010.

Pavol Pecho, et al., "Design of air circuit disinfection against COVID-19 in the conditions of airliners", 9th International Conference on Air Transport—INAIR 2020, Challenges of Aviation Development, Transportation Research Procedia 51 (2020) 313-322.

Ahsan Munir, "Dead End Membrane Filtration", ENE 806, Laboratory Feasibility Studies in Environmental Engineering, Spring 2006.

* cited by examiner

SYSTEMS AND METHODS FOR BATCH PROCESSING AIR TAKEN FROM A POPULATED ENVIRONMENT TO DESTROY PATHOGENS AND THEN REINTRODUCE THE AIR INTO THE POPULATED ENVIRONMENT

CROSS-REFERENCE TO PROVISIONAL APPLICATION

This patent application claims priority under 35 U.S.C. § 119 to U.S. Provisional Patent Application Ser. No. 63/076,390 entitled "Systems and Methods for Batch Processing Air Taken from a Populated Environment to Destroy Pathogens and then Reintroduce the Air Into the Populated Environment," which was filed on Sep. 10, 2020, and is incorporated herein by reference in its entirety.

TECHNICAL FIELD

The present invention is generally related to air treatment system and methods. The present invention is more particularly related to systems and methods for treating air taken from a populated environment and treating the air in batches to destroy pathogens contained therein and then reintroducing the air back into the populated environment.

BACKGROUND

Airborne diseases are caused by pathogenic microbes small enough to be discharged from an infected person via coughing, sneezing, laughing and close personal contact or aerosolization of the microbes. The discharged microbes can remain suspended in the air on dust particles, respiratory and water droplets. Illness can be caused when the pathogenic microbes are inhaled or contact mucus membranes or when secretions remaining on a surface are touched.

Most people live, work and enjoy their leisure activities in densely populated environments, which increase their exposure to many pathogens. The risk of cross-infection is a psychological stress factor as well as a real health issue, which reduces the well-being of the population and has a powerful economic impact due to, for example, absenteeism and reduced productivity. Human history records many pandemics, e.g. the Spanish influenza epidemic in 1918-1919, which was by far the most lethal flu pandemic of the 20th century, infecting about a quarter of the global population and killing more than 40 million people. Increased mobility permits a rapid dissemination of new diseases and elevates the risk of further pandemics, e.g. of Severe Acute Respiratory Syndrome (SARS) and Covid-19, as well as the emergence of old and well-known diseases that have developed resistance to existing drug treatment, e.g. tuberculosis. Another threat imposes the rapid mutation of some microorganisms and their adaptation as a cause of human diseases, e.g. Ebola, the H5N1 strain of avian flu, Covid-19, etc.

Harmful pathogens can find their way into air within closed environments populated by human life, potentially contaminating occupants of these closed environments. Such is commonly the case with influenza and commons colds. More recently, more harmful viruses such as the Covid-19 have caused great concern, economic impact, illness and death as it has propagated into populated environment where it has infected many human beings. The treatment of air has always been of concern for society, but threats of pandemic have intensified the worldwide need for improvements in treating air that is breathed in by humans in public and private environments where disease continues to proliferate.

All these factors increase the importance of making the indoor air as clean from any pathogens as possible, and with high perceived air quality as the cleanest outdoor air, or even better. Unfortunately, most of our indoor work and living places are not designed to prevent the spread of airborne pathogens. Furthermore, air distribution systems may even enhance transmission. In order to solve this multidisciplinary problem successfully, knowledge in different fields needs to be combined: the type of pathogen, its generation and survival mechanism before affecting the host, possible disinfection methods to eradicate it, and transmission mechanisms among people.

Although transmission of airborne diseases can be greatly reduced by practicing social and respiratory etiquette. Staying home when ill, keeping close contact with an ill person to a minimum, allowing a few feet distance from others while ill, and wearing a mask, covering coughs and sneezes with elbow or tissue can greatly reduce transmission, environmental controls and engineering alternatives can also help reduce transmission of water droplet aerosolized pathogens.

Engineering solutions can be proposed in order to efficiently reduce the pathogen loads released in air, disable their virulence, and make them harmless for healthy inhabitants. The methods applied should be neither life nor health threatening, nor should they reduce in any way occupants' perceived air quality or thermal comfort. They should also ideally be user friendly (if people are to operate them), with low noise emission, energy efficient, highly ergonomic and aesthetic.

What are needed are improved systems and methods that can treat contaminated air and render germ-free oxygen. The present inventors disclose such systems and methods as will be further described herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

Most systems are designed around a continuous flow model, which makes it difficult to evaluate how much exposure to treatment is enough.

It is a feature of the present invention to provide systems and methods for treating air taken from a populated environment in batches to destroy pathogens contained therein and then reintroducing the air back into the populated environment.

In accordance with a feature a system for batch processing air to destroy pathogens contained therein is disclosed, in accordance with the embodiments. Intake air can be split into multiple batches for processing via a multi-compartment treatment system which can be installed along, or as part of, a typical air conditioning system (e.g., building HVAC, vehicle heating and cooling componentry, airplane heating and cooling componentry).

In accordance with another feature, a four batch/compartment system and process can be provided where a first chamber can be interfaced with an air return portion of an airflow system to receive (be filled with) untreated air from a populated environment (e.g., a building, a room, a motor vehicle, an airplane), while a second chamber can treat air previously received from the first chamber, and a third chamber can allow air treated in the second chamber to stabilize before it is released back into an airflow system from a fourth chamber that can be interfaced with an airflow distribution system (e.g., HVAC system) and be distributed by vents back into the populated environment.

In accordance with another feature, the first camber can be viewed as the "filling chamber", the second chamber as an "expressing chamber", the third chamber as a "relaxing chamber", and the fourth chamber as an "exhausting chamber".

In accordance with yet another features, the second chamber can also analyze, as well as treat, air previously received from the first chamber.

In accordance with another features, batch processing of air can include treatment with ozone in the second chamber to destroy pathogens such as the Corona (Covid-19) virus. By batch processing the air, the amount of ozone exposure needed to purify each batch can be more rigorously determined empirically.

In accordance with yet another features, the batch processing system can be installed in a car or airplane, or for an entire HVAC system that services a building or warehouse.

In accordance with yet another feature, when ozone treatment is used in the present system, the expressing chamber is where air treatment by ozone can occur, and the relaxing chamber is where ozonated air ($O_3$) can return to safely breathable levels of air ($O_2$).

In accordance with yet another feature, ultraviolet light at the UVC level can be utilized in any of the four chambers to further assure the destruction of harmful pathogens. UVC light in the third chamber, for example, can assist with the relaxation of ozone in air. This is possible because UV energy can also break one of the oxygen bonds in an ozone molecule.

In accordance with another features, activated carbon filters can be incorporated at an exit of the fourth chamber, where it interfaces with the airflow system that can carry treated oxygen through at least one of an HVAC system or the vents to the populated environment.

Although the chambers can be present in a linear fashion, an alternate embodiment can be utilized where the four chambers are presented as part of a circular housing with four sealed chambers formed by a four wall partition that can be rotated 360 degrees within the housing.

In accordance with another features, the four walls can include rubber seals that interface with a continuous interior wall of the circular housing as the walls are rotated to move air from the first through fourth chambers. Air can be moved 90-degrees at a time as the walls are rotated within the circular housing. Rotational movement can occur every few second to several minutes.

These and other features will be further appreciated from the following description and associated drawings.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
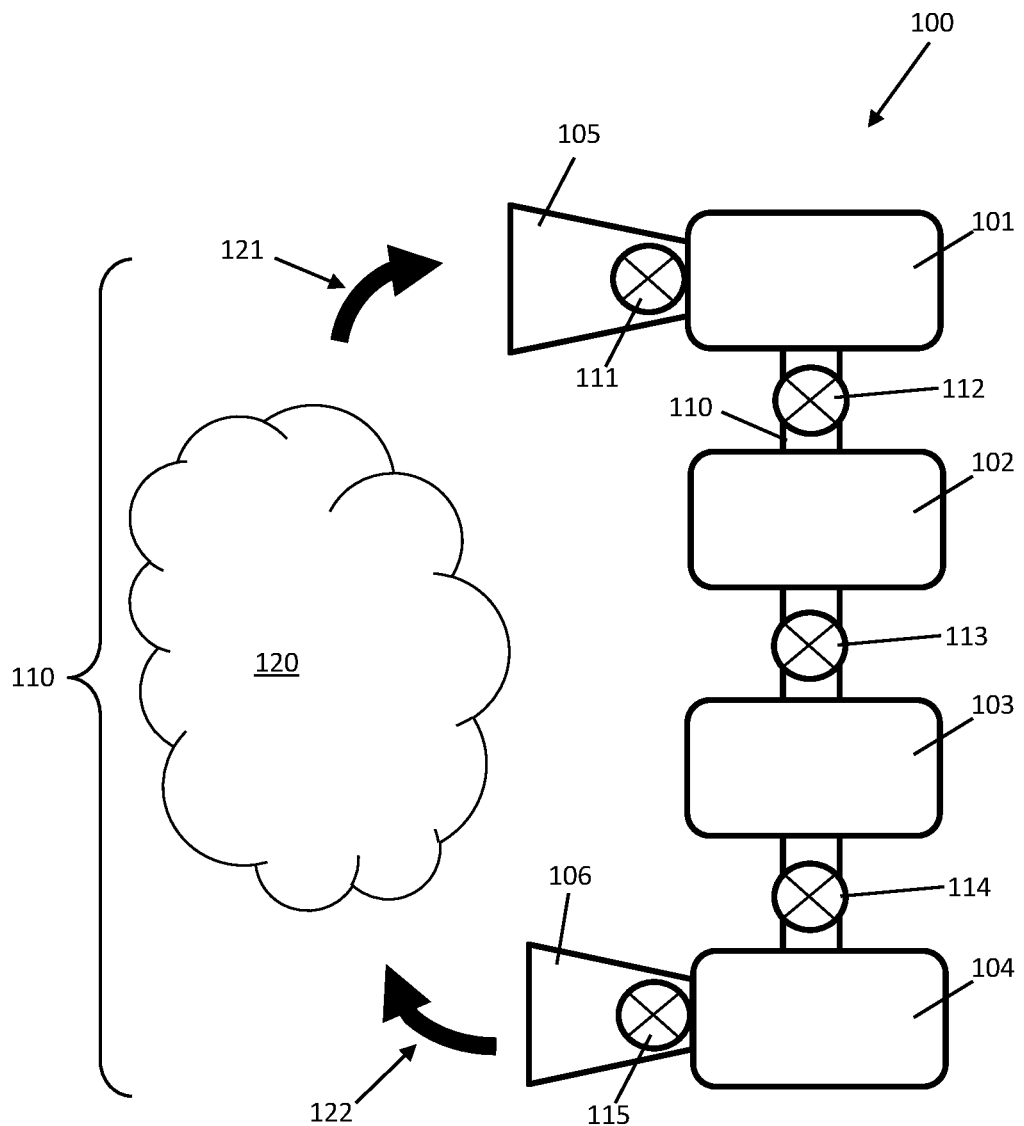
FIG. 1 illustrates a block diagram of a system for batch processing air to destroy pathogens contained therein, in accordance with features of the embodiments.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an embodiment" or "in an example embodiment" and variations thereof as utilized herein may not necessarily refer to the same embodiment and the phrase "in another embodiment" or "in another example embodiment" or "in an alternative embodiment" and variations thereof as utilized herein may or may not necessarily refer to a different embodiment. It is intended, for example, that claimed subject matter can include combinations of embodiments in whole or in part. In addition, identical reference numerals utilized herein with respect to the drawings can refer to identical or similar parts or components.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Air can be treated to destroy airborne pathogens. This can be accomplished through a unit installed in a car or airplane, or for an entire HVAC system that services a building or warehouse. Most systems are designed around a continuous flow model which makes it difficult to evaluate how much exposure to treatment is enough. By batch processing the air, the amount of ozone exposure needed to purify each batch can be more rigorously determined empirically. Intake air can be split into multiple batches for processing via a multi-compartment treatment system which can be installed along, or as part of, a typical airflow system (e.g., building HVAC, vehicle heating and cooling componentry, airplane heating and cooling componentry). For example, in a four batch/compartment system and process, a. first chamber can be interfaced with an air return portion of an airflow system to receive (be filled with) untreated air from a populated environment (e.g., a room, a motor vehicle, an airplane), while a second chamber can analyze and treat air previously received from the first chamber, and a third chamber can allow air treated in the second chamber to stabilize the air, now treated, before it is released back into an airflow system from a fourth chamber that can interface with the airflow system and be distributed by vents back into the populated environment. The first camber can be viewed as the "filling chamber", the second chamber as an "expressing chamber", the third chamber as a "relaxing chamber", and the fourth chamber as an "exhausting chamber".

When ozone treatment is used in the present system, the expressing chamber is where air treatment by ozone can occur, and the relaxing chamber is where ozonated air ($O_3$) can return to safely breathable levels of air ($O_2$). Ultraviolet light at the UVC level can be utilized in any of the four chambers to further assure the destruction of harmful pathogens. UVC light in the third chamber can assist with the relaxation of ozone in air. This is possible because UV energy can also break one of the oxygen bonds in an ozone molecule. Additionally, activated carbon filters can be incorporated at the interface of the fourth chamber where it interfaces with the airflow system that can carry treated oxygen through the vents to the populated environment.

Referring to FIG. 1, illustrated is a system 100 for batch processing air 120 to destroy pathogens that can be contained therein, in accordance with features of the embodiments. Although different configurations can be presented, a linear model is illustrated. Air 120 from a populated environment 110 can be untreated and can contain harmful pathogens. The untreated air can be drawn into a return vent 105 from the populated environment 110 as shown by inflow arrow 121 and into a filling chamber 101. The untreated air can then be provided to an expressing chamber 102 wherein it is treated and can become treated air. The treated air can then be provided to a relaxing chamber 103 wherein it is given time to settle. Settlement time can be helpful where treatment means using components such as ozone are used. The treated air can then be provided to an exhaust chamber 104 wherein it can be provided back to the populated environment 110 at shown by outflow arrow 122 via at least one supply vent 106.

A series of valves 111-115 can be utilized to control the flow of air through the system 100 and seal the chambers from each other during processing. For example, valve 111 control the flow of air into the filling chamber 101 from the populated environment 110 via the return vent. Valve 112 can control flow from the filling chamber 101 to the expressing chamber 102 and can create a seal between the filling chamber and the expressing chamber. Valve 113 can control flow from the expressing chamber 102 to the relaxing chamber 103 and can create a seal between tee expressing chamber 102 and the relaxing chamber 103. Valve 114 can control flow from the relaxing chamber 103 to the exhausting chamber 104 and can create a seal between the relaxing chamber 103 and the exhausting chamber 104. Valve 115 can control air flowing from the exhausting chamber to the populated environment via the at least one supply vent 106.

Referring to FIG. 2, a block diagram 200 of a system for batch processing air 120 to destroy pathogens that may be contained therein is illustrated, in accordance with features of the embodiments. Although a multi chamber treatment system can be presented in a linear fashion as illustrated in FIG. 1, an alternate embodiment can be utilized where a multi chamber treatment system 200 includes four chambers 201-204 as areas that can be presented as part of a circular housing 210 wherein areas defining the four sealed chambers 201-204 are formed by four wall partitions 221-224 that can be rotated 360 degrees (90-degrees over a specified time that can be from a few second to several minutes), within the circular housing 210. The wall partitions 221-224 can include rubber material incorporated as part of the construction for, or formed onto edges of, the four wall partitions 211-214 for adapting the four wall partitions 211-214 to interface with the continuous interior wall 218 of the circular housing 210 as the four wall partitions 221-224 are rotated 90-degrees to move untreated and treated air from the filling chamber 201 through exhausting chamber 204 and creates a seal between the filling 201, expressing 202, relaxing 203 and exhausting 204 chambers as the four wall partitions are rotated 360 degrees and contract the continuous inner wall 218 during air processing/treatment. The four wall partitions 201-204 can extend from a central hub 205 that can cause rotation of the four wall partitions 201-204 within the housing 210.

The housing 210 of the multi-chamber treatment system 200 can be coupled between at least one air return vent 206 associated a populated environment 220 and at least one supply vent 208 associated with and providing treated air into the populated environment 220. The multi-chamber treatment system can be located in an area 222 located outside of the populated environment 220. The housing 210 can be coupled at the filing chamber 201 to return vent 206 associated with the populated environment 220 via return ducting 207, whereas the exhausting chamber 204 can be coupled to the supply vent 208 associated with the populated environment 220 via supply ducting 209.

An ozone generator 215 can be provided at part of the expressing chamber 202 to treat untreated air received from the filling chamber 201. The ozone generator 215 can be coupled to the expressing chamber via Ozone tubing 213. UVC lighting 219 can also be provided in at least one of the chambers 201-204 to further treat air in the housing 210. When provided in the relaxing chamber 203, UVC lighting can help return ozonated air to breathable oxygen as treated air. A computer 217 can control the ozone generator 215, UVC lighting 219 and rotating hub 205 during air processing.

Referring to FIG. 3, illustrated is a block diagram of a system 300 for batch processing air to destroy pathogens contained therein when a multi-chamber air treatment system 201 deployed in association with HVAC components 210 supplying a populated environment 320, in accordance with features of the embodiments. A multi-chamber air treatment system 201 can be coupled to the populated environment 320 via air return ducting 311 that can draw in return air as shown be return air arrow 102. Air can be processed through stages within the multi-chamber air treatment system 201 and then can be provided to an HVAC system 310 via output ducting 313. The HVAC system conditions the treated air (cooling, or heating) and then can provide the treated air to the populated environment 320 via supply ducting 315 as shown by supply air arrows 103. The populated environment 320 can include a building interior, a room, an inner cabin of a motor vehicle, or airplane cabin, to mention just a few applications without intending limitation of the present embodiments.

Figure 2:
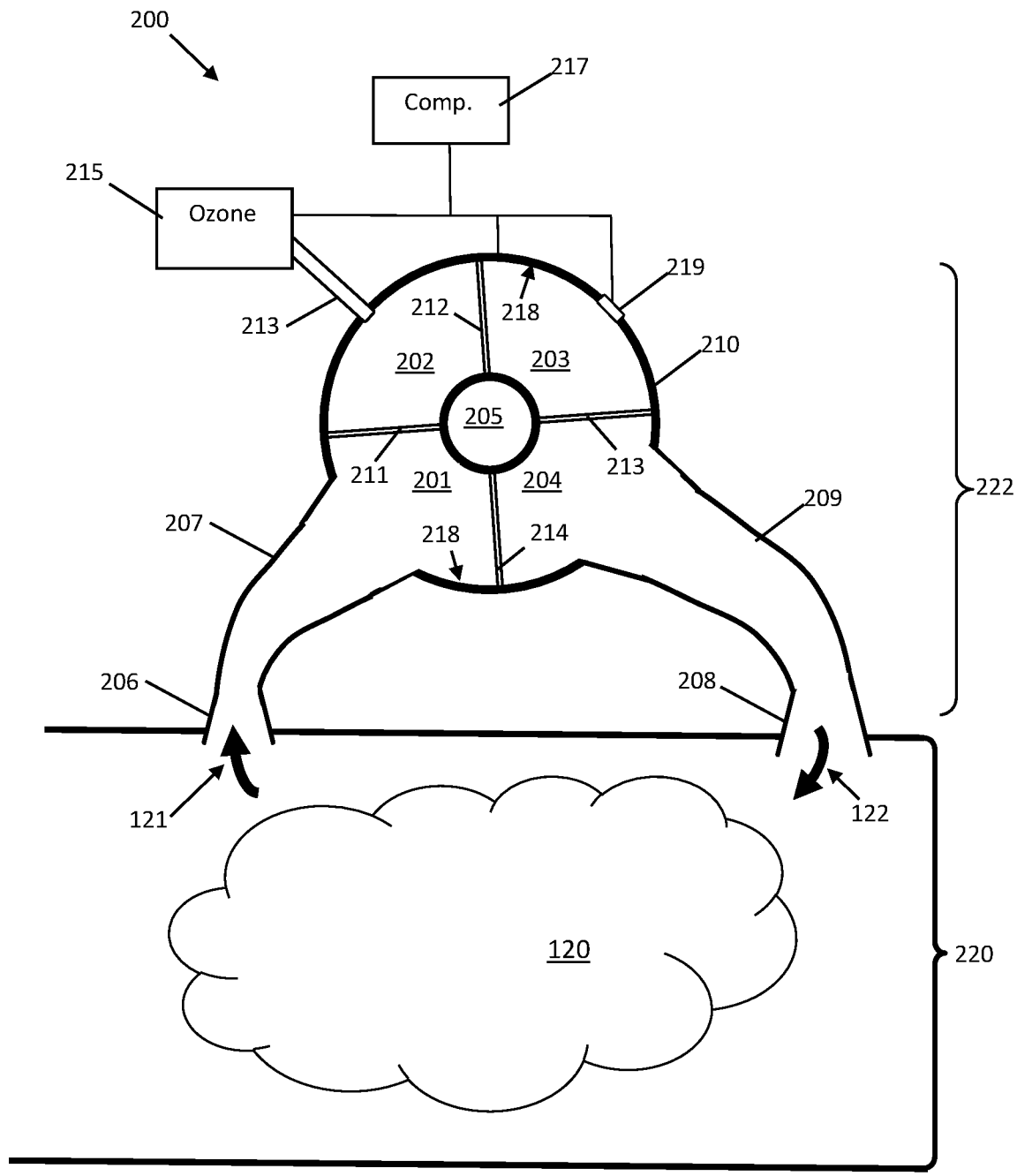
FIG. 2 illustrates a block diagram of another embodiment of a system for batch processing air to destroy pathogens contained therein, in accordance with features of the embodiments.
Figure 3:
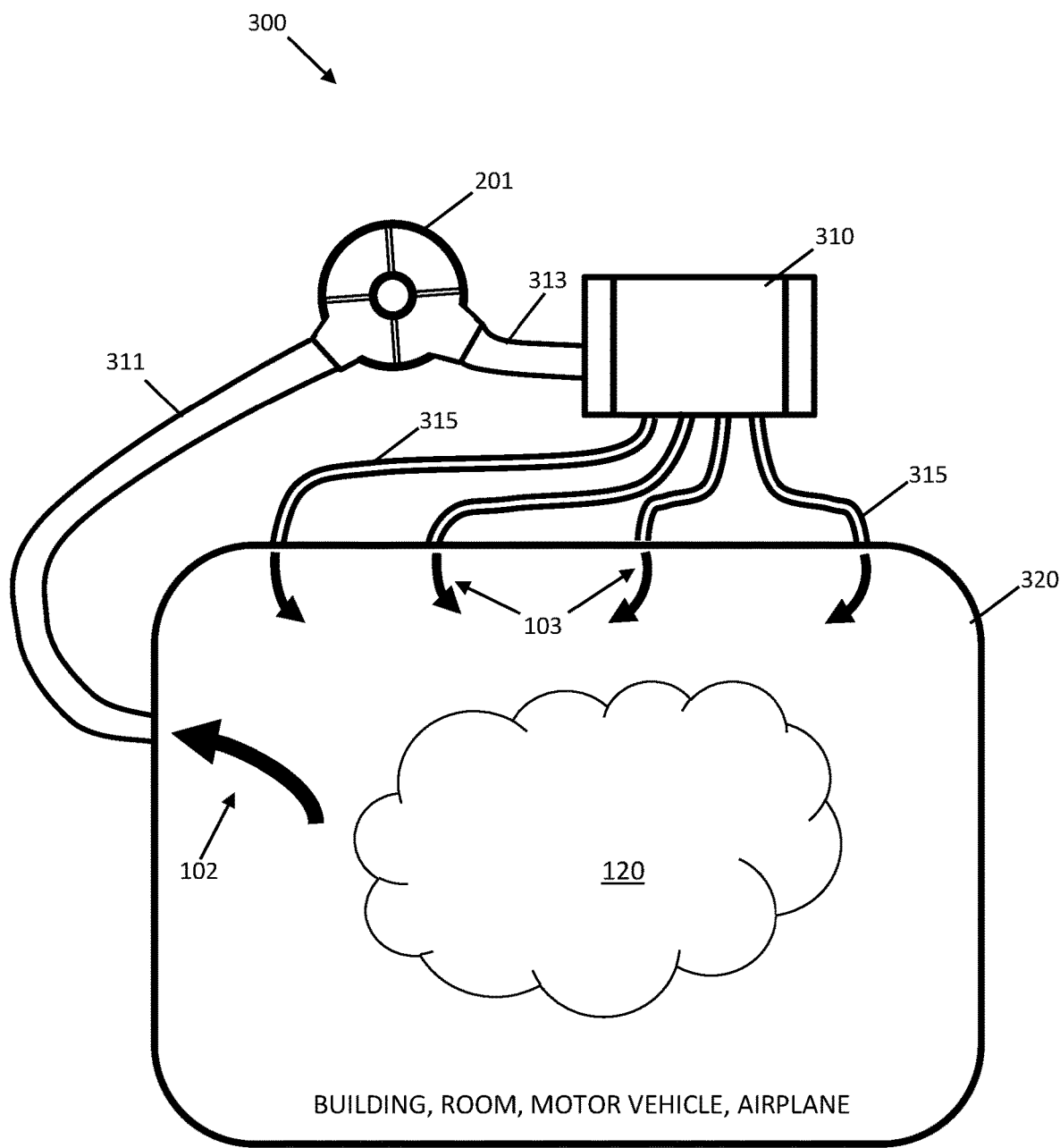
FIG. 3 illustrates another block diagram of a system for batch processing air to destroy pathogens contained therein when deployed in association with HVAC components, in accordance with features of the embodiments.
Figure 4:
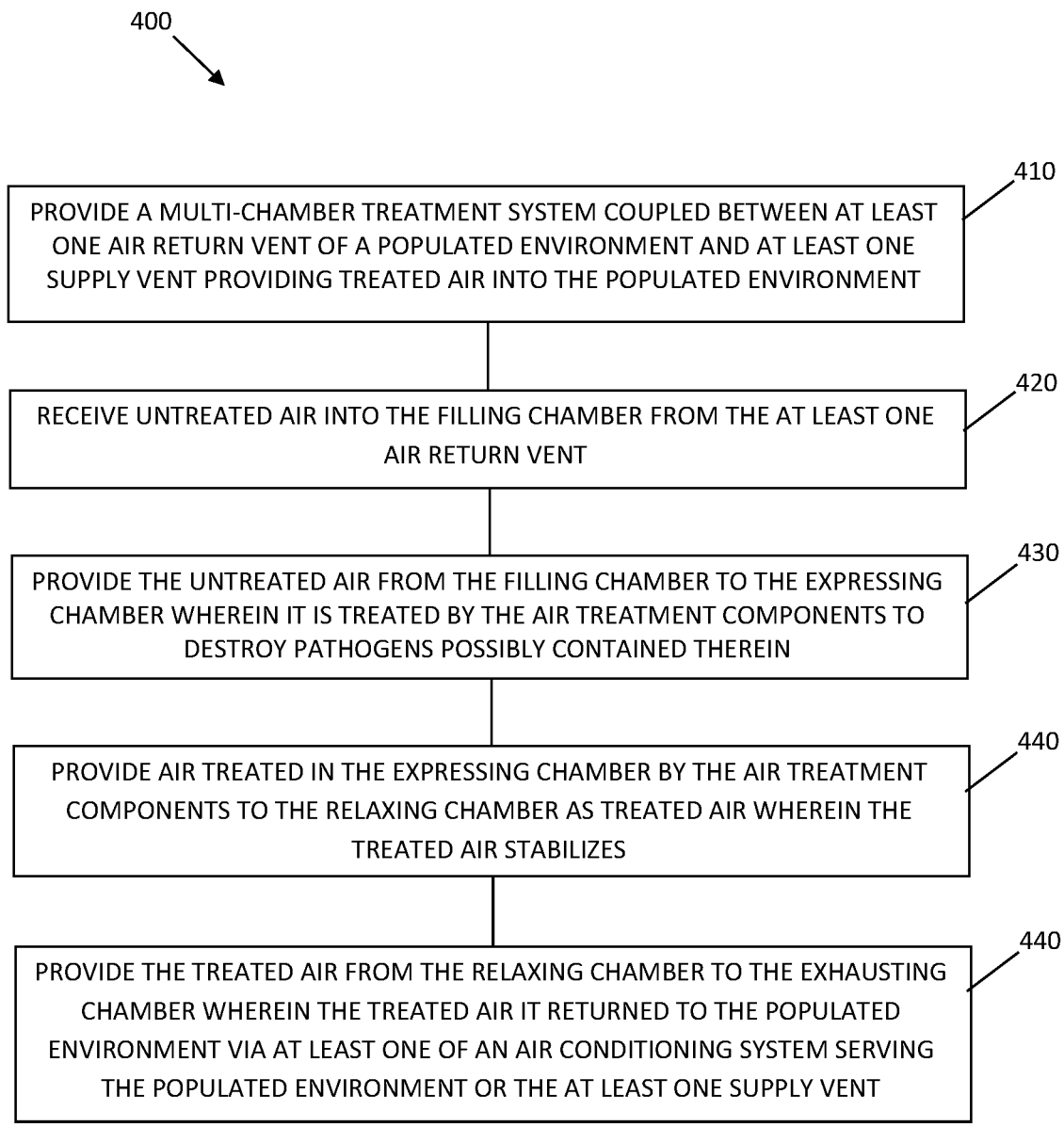
FIG. 4 illustrates a flow diagram of a method of batch processing air to destroy pathogens contained therein, in accordance with features of the embodiments.

Referring to FIG. 4, illustrated is a flow diagram of a method 400 of batch processing air to destroy pathogens contained therein, in accordance with features of the embodiments. Referring to Block 410, a multi-chamber treatment system can be provided, which can be coupled between at least one air return vent of the populated environment and at least one supply vent providing treated air into the populated environment. As discussed with respect to FIGS. 1-3, the system can include a filling chamber coupled to the at least one air return vent, an expressing chamber including air treatment components adapted for treating the untreated air to destroy any pathogens possibly contained in the untreated air and convert the untreated air to the treated air, a relaxing chamber adapted to allow the treated air previously treated in the treatment compartment to stabilize, and an exhausting chamber coupled to at least one of an air conditioning system serving the populated environment or the at least one supply vent providing the treated air back into the populated environment. Referring to Block 420, untreated air can be received into the filling chamber from the at least one air return vent. The untreated air can then be provided from the filling chamber to the expressing chamber wherein it is treated by the air treatment components to destroy pathogens possibly contained therein, as shown in Block 430. As shown in Block 440, air treated in the expressing chamber by the air treatment components can be provided to the relaxing chamber as treated air wherein the treated air stabilizes. Then, as shown in Block 450, the treated air can be provided from the relaxing chamber to the exhausting chamber wherein the treated air is returned to the populated environment via at least one of an air conditioning system serving the populated environment or the at least one supply vent.

Figure 5:
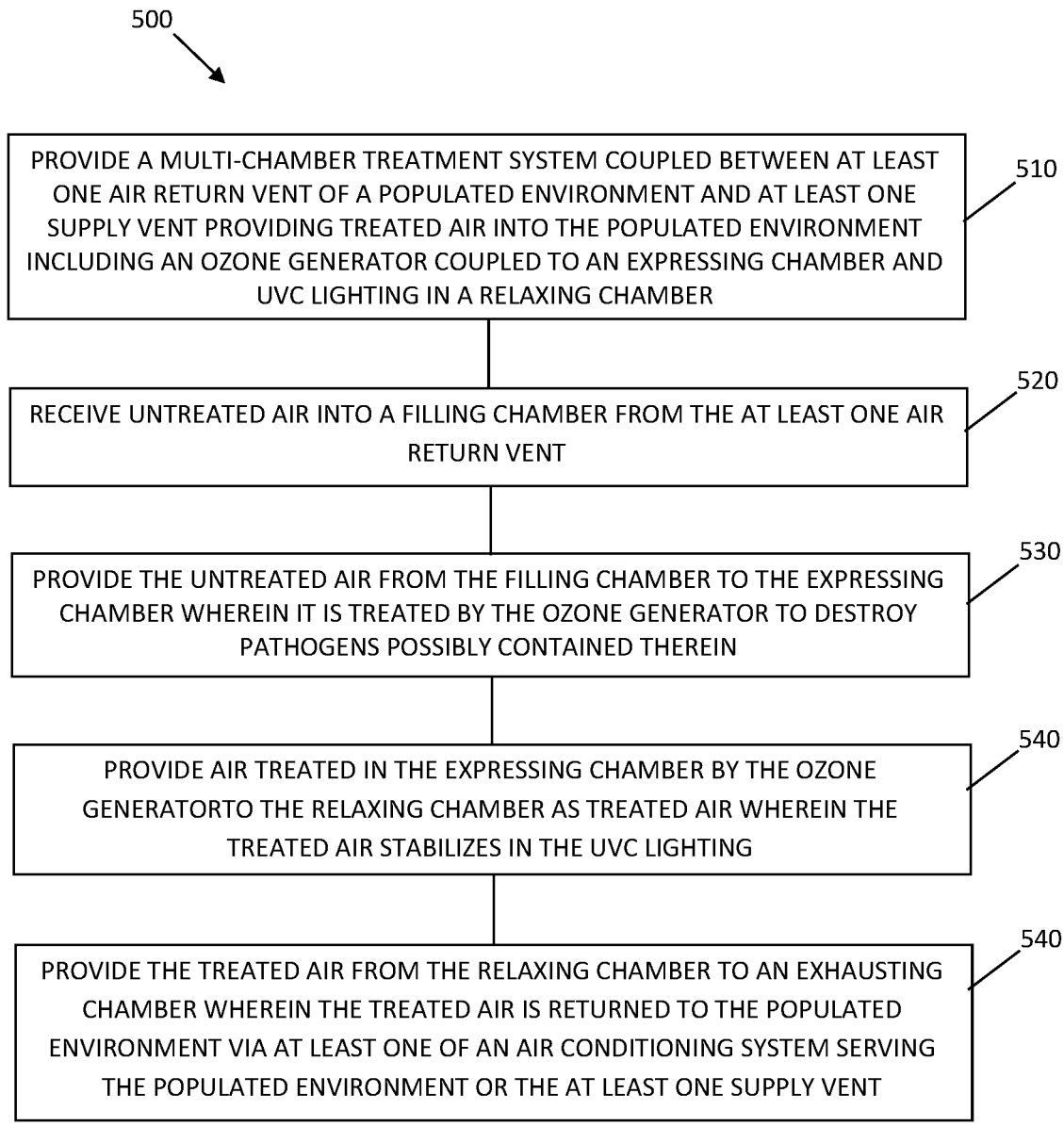
FIG. 5 illustrates another flow diagram of a method of batch processing air to destroy pathogens contained therein, in accordance with features of the embodiments.

Referring to FIG. 5, illustrated is another flow diagram 500 of a method of batch processing air to destroy pathogens contained therein, in accordance with features of the embodiments. Referring to Block 510, a multi-chamber treatment system coupled between at least one air return vent of the populated environment and at least one supply vent providing treated air into the populated environment can be provided that includes an ozone generator coupled to an expressing chamber and UVC lighting in a relaxing chamber. Referring to Block 520, untreated air can be received into a filling chamber from the at least one air return vent. The untreated air can then be provided from the filling chamber to the expressing chamber wherein it is treated by the ozone generator to destroy pathogens possibly contained therein, as shown in Block 530. As shown in Block 540, air treated in the expressing chamber by the ozone generator can be provided to the relaxing chamber as treated air wherein the treated air stabilizes in the UVC lighting. Then, as shown in Block 550, the treated air can be provided from the relaxing chamber to an exhausting chamber wherein the treated air can be returned to the populated environment via at least one of an air conditioning system serving the populated environment or the at least one supply vent.

Accordingly, a system can be provided for batch processing untreated air taken from a populated environment to destroy pathogens possibly contained therein. The system can include a multi-chamber treatment system coupled between at least one air return vent of the populated environment and at least one supply vent providing treated air into the populated environment. The system can include a filling chamber coupled to the at least one air return vent of the populated environment and adapted to receive the untreated air therefrom, an expressing chamber including components adapted for treating the untreated air to destroy any pathogens possibly contained in the untreated air and convert the untreated air to the treated air, a relaxing chamber adapted to allow the treated air previously treated in the treatment compartment to stabilize and an exhausting chamber coupled to at least one of an air conditioning system serving the populated environment or the at least one supply vent providing the treated air back into the populated environment. A sensor can be included in the expressing chamber to analyze the untreated air received from the filling chamber. UVC lighting can be included in at least one of the filing, expressing, relaxing and exhausting chambers. An ozone generation system can be included and can be coupled to the expressing chamber, wherein treatment of the untreated air can be by ozone gas. UVC lighting when provided in the relaxing chamber can be adapted to return ozonated air ($O_3$) to safely breathable air ($O_2$). The populated environment can include at least one of a car, an airplane, a building, or a room. An activated carbon filter can be included and can be disposed at an exit of the exhausting chamber where the exhausting chamber interfaces with at least one of the air conditioning or supply vents that can carry treated air back into the populated environment.

A system for batch processing untreated air taken from a populated environment to destroy pathogens possibly contained therein can include a multi-chamber treatment system coupled between at least one air return vent of the populated environment and at least one supply vent providing treated air into the populated environment, wherein the system can further include a circular housing comprising four wall partitions adapted to rotate 360 degrees within a continuous inner wall of the circular housing. The four wall partitions can define a filling chamber coupled to the at least one air return vent of the populated environment and adapted to receive the untreated air therefrom, an expressing chamber including components adapted for treating the untreated air to destroy any pathogens possibly contained in the untreated air and convert the untreated air to the treated air, a relaxing chamber adapted to allow the treated air previously treated in the treatment compartment to stabilize, and an exhausting chamber coupled to at least one of an air conditioning system serving the populated environment or the at least one supply vent providing the treated air back into the populated environment.

Rubber can be incorporated onto edges of the four wall partitions and can be adapted to interface with the continuous interior wall of the circular housing as the four wall partitions are rotated 90-degrees at a specified time (e.g., every few seconds or up to several minutes) to move untreated and treated air from the filling chamber through exhausting chamber and create a seal between the filling, expressing relaxing and exhausting chambers as the four wall partitions are rotated.

A method for batch processing untreated air taken from a populated environment to destroy pathogens possibly contained therein can utilize a multi-chamber treatment system coupled between at least one air return vent of the populated environment and at least one supply vent providing treated air into the populated environment. Using the system, untreated air can be received into the filling chamber from the at least one air return vent. The untreated air can be provided from the filling chamber to the expressing chamber wherein it is treated by the air treatment components to destroy pathogens possibly contained therein.

Air treated in the expressing chamber by the air treatment components can then be provided to the relaxing chamber as treated air wherein the treated air can become stabilized. The treated air can then be provided from the relaxing chamber to the exhausting chamber wherein the treated air is returned to the populated environment via at least one of an air conditioning system serving the populated environment or the at least one supply vent. In a circular housing configuration, air can be moved in batches as walls are rotated 90-degrees at a time through each chamber within the circular housing. In linear configurations, the unlocking and locking of valves disposed between each chamber can move air.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

The invention claimed is:

1. A system for batch processing untreated air taken from a populated environment to destroy pathogens contained therein, comprising a multi-chamber treatment system coupled between at least one air return vent of the populated environment and at least one supply vent providing treated air into the populated environment, the system further including:
a filling chamber coupled to the at least one air return vent of the populated environment and operable to receive the untreated air therefrom;
an expressing chamber including components operable to treat the untreated air to destroy any pathogens contained in the untreated air and convert the untreated air to the treated air;
a relaxing chamber operable to allow the treated air previously treated in a treatment compartment to stabilize; and
an exhausting chamber coupled to at least one of an air conditioning system serving the populated environment or the at least one supply vent providing the treated air back into the populated environment.

2. The system of claim 1, further comprising a sensor in the expressing chamber to analyze the untreated air received from the filling chamber.

3. The system of claim 1, further comprising UVC lighting in at least one of: the filing chamber, the expressing chamber, the relaxing chamber, and the exhausting chamber.

4. The system of claim 1, further comprising an ozone generation system coupled to the expressing chamber, wherein a treatment of the untreated air includes a treatment by ozone gas.

5. The system of claim 4, further comprising UVC lighting in the relaxing chamber and operable to return ozonated air ($O_3$) to safely breathable air ($O_2$).

6. The system of claim 1, wherein the populated environment includes at least one of: a car, an airplane, a building, or a room.

7. The system of claim 1, further comprising an activated carbon filter disposed at an exit of the exhausting chamber where the exhausting chamber interfaces with at least one of: the air conditioning system or the at least one supply vent that carry treated air back into the populated environment.

8. A system for batch processing untreated air taken from a populated environment to destroy pathogens contained therein, comprising:
a multi-chamber treatment system coupled between at least one air return vent of the populated environment and at least one supply vent providing treated air into the populated environment, the system and further including a circular housing including four wall partitions operable to rotate 360 degrees within a continuous inner wall of the circular housing, the four wall partitions defining:
a filling chamber coupled to the at least one air return vent of the populated environment and operable to receive the untreated air therefrom;
an expressing chamber including components operable to treat the untreated air to destroy any pathogens contained in the untreated air and convert the untreated air to the treated air;
a relaxing chamber operable to allow the treated air previously treated in a treatment compartment to stabilize; and
an exhausting chamber coupled to at least one of an air conditioning system serving the populated environment or the at least one supply vent providing the treated air back into the populated environment; and
rubber incorporated onto edges of the four wall partitions operable to interface with the continuous interior wall of the circular housing as the four wall partitions are rotated to move untreated and treated air from the filling chamber through exhausting chamber and create a seal between the filling chamber, the expressing chamber, the relaxing chamber and the exhausting chamber as the four wall partitions are rotated.

9. The system of claim 8, further comprising a sensor in the expressing chamber to analyze the untreated air received from the filling chamber.

10. The system of claim 8, further comprising UVC lighting in at least one of: the filing chamber, the expressing chamber, the relaxing chamber, and the exhausting chamber.

11. The system of claim 8, further comprising an ozone generation system coupled to the expressing chamber, wherein a treatment of the untreated air includes a treatment by ozone gas.

12. The system of claim 11, further comprising UVC lighting in the relaxing chamber and operable to return ozonated air ($O_3$) to safely breathable air ($O_2$).

13. The system of claim 8, wherein the populated environment includes at least one of: a car, an airplane, a building, or a room.

14. The system of claim 8, further comprising an activated carbon filter disposed at an exit of the exhausting chamber where the exhausting chamber interfaces with at least one of: the air conditioning system or the at least one supply vent that carry treated air back into the populated environment.

15. A method for batch processing untreated air taken from a populated environment to destroy pathogens contained therein, comprising:
- providing a multi-chamber treatment system coupled between at least one air return vent of the populated environment and at least one supply vent providing treated air into the populated environment, the system further including a filling chamber coupled to the at least one air return vent, an expressing chamber including air treatment components operable to treat the untreated air to destroy any pathogens contained in the untreated air and convert the untreated air to the treated air, a relaxing chamber operable to allow the treated air previously treated in a treatment compartment to stabilize, and an exhausting chamber coupled to at least one of an air conditioning system serving the populated environment or the at least one supply vent providing the treated air back into the populated environment;
- receiving untreated air into the filling chamber from the at least one air return vent;
- providing the untreated air from the filling chamber to the expressing chamber wherein it is treated by the air treatment components to destroy pathogens contained therein;
- providing air treated in the expressing chamber by the air treatment components to the relaxing chamber as treated air wherein the treated air stabilizes; and
- providing the treated air from the relaxing chamber to the exhausting chamber wherein the treated air is returned to the populated environment via at least one of an air conditioning system serving the populated environment or the at least one supply vent.

16. The method of claim 15, wherein the air treatment components include an ozone generator operable to treat the untreated air.

17. The method of claim 15, wherein UVC lighting in included in at least one of the filing chamber, the expressing chamber, the relaxing chamber and the exhausting chamber and is operable to further treat at least one of: the untreated air and the treated air.

18. The method of claim 17, wherein UVC lighting included in the relaxing chamber is used to return ozonated air ($O_3$) to safely breathable air ($O_2$).

19. The method of claim 15, wherein the populated environment includes at least one of: a car, an airplane, a building, or a room.

20. The system of claim 15, an activated carbon filter is disposed at an exit of the exhausting chamber where the exhausting chamber interfaces with at least one of the air conditioning system or the at least one supply vent that carry treated air back into the populated environment and the carbon filter filters ozone components from the treated air.

* * * * *